United States Patent [19]
Saska et al.

[11] Patent Number: 5,482,631
[45] Date of Patent: Jan. 9, 1996

[54] SEPARATION OF INOSITOLS FROM SUGARS AND SUGAR ALCOHOLS

[75] Inventors: Michael Saska; Moustapha Diack, both of Baton Rouge, La.

[73] Assignee: Board of Supervisors of Louisiana State University and Agricultural and Mechanical College, Baton Rouge, La.

[21] Appl. No.: 319,240

[22] Filed: Oct. 6, 1994

[51] Int. Cl.$^6$ .................................................. B01D 15/08
[52] U.S. Cl. ......................... 210/635; 210/656; 210/659; 210/198.2; 127/46.2; 127/55; 568/833; 568/872
[58] Field of Search ..................... 210/635, 656, 210/638, 660, 659, 692, 198.2; 127/46.2, 55; 568/833, 872

[56] References Cited

U.S. PATENT DOCUMENTS

| | | | |
|---|---|---|---|
| 2,929,746 | 3/1960 | Assalini | 127/46 |
| 2,971,868 | 2/1961 | Assalini | 127/46 |
| 3,982,956 | 9/1976 | Schoenrock et al. | 127/46 A |
| 4,482,761 | 11/1984 | Chao et al. | 568/833 |
| 4,799,965 | 1/1989 | Bakker et al. | 127/46.2 |
| 4,997,489 | 3/1991 | Ravinowitz | 127/43 |
| 5,091,596 | 2/1992 | Kennington et al. | 568/833 |
| 5,096,594 | 3/1992 | Rabinowitz | 210/656 |
| 5,296,364 | 3/1994 | Agrawal | 435/155 |
| 5,306,840 | 4/1994 | Tronconi | 558/146 |

OTHER PUBLICATIONS

Dionex Corporation, "Installation Instructions and Troubleshooting Guide for the CarboPac™ PA1," document No. 034441, revision 01 (Oct. 1, 1990) pp. i–30.

Primary Examiner—Ernest G. Therkorn
Attorney, Agent, or Firm—John H. Runnels

[57] ABSTRACT

When a strong base anion exchange resin, such as a chloride-form strong base anion exchange resin, is conditioned with a low concentration of hydroxyl (for example, an NaOH solution with a concentration between 1 and 10 mM), the conditioned resin separates in, sit, Is from sugars and sugar alcohols, while still allowing ready desorption of the sugars from the resin. The feedstock is first passed over a column containing this conditioned resin, followed by a mobile phase solvent, preferably water. The inositols have a lower affinity for the treated resin than do the sugars and sugar alcohols in the feedstock, and therefore pass through the column more quickly. The process may economically be performed on industrial-scale inositol separations, particularly when used in a preferred simulated moving bed chromatographic system.

19 Claims, 1 Drawing Sheet

SEPARATION OF INOSITOLS FROM SUGARS AND SUGAR ALCOHOLS

This invention pertains to the purification of certain cyclitols, namely the isomers and derivatives of inositol (1,2,3,4,5,6-hexahydroxycyclohexane); particularly to a process to separate inositols and inositol derivatives from a mixture such as a raw sugar cane extract or an almond hull extract that also contains sugar alcohols (e.g., mannitol, sorbitol, or arabitol), sugars (e.g., glucose, fructose, sucrose, raffinose, or stachyose), or both.

Of the nine isomers of inositol, the most abundant in nature are the myo- and chiro-inositols. Myo-inositol is an important growth factor. In the United States, the primary use of myo-inositol is as a component of baby formula. The relatively small market for myo-inositol would grow substantially if its cost could be decreased. Most of the United States supply of myo-inositol currently comes from China and Japan, where it is produced primarily from corn steep liquor or rice bran. At least one sugar refiner in Finland produces smaller amounts of myo-inositol for European markets from beet molasses.

Myo-inositol exists in nature either in its free form (found, for example, in sugarcane, beet molasses, and almond hulls) or as a hexaphosphate called phytin (found, for example, in corn steep liquor). Industrial purification of phytin from corn steep liquor involves precipitation with calcium, followed by hydrolysis with a strong acid. Separation of free form inositols from plant extracts in accordance with the present invention costs less and is safer than is chemical treatment of phytin.

The chiro-inositol isomer is found, for example, in soy molasses. Chiro-inositol is not presently available on a commercial basis, but it has been reported to have value as a therapeutic compound. See, e.g., U.S. Pat. No. 5,091,596.

Beet and cane molasses are raw plant extracts that can be refined into food grade sugar, especially sucrose. Molasses is a byproduct of primary sugar refining. Molasses is the fraction that remains after as much sucrose has been crystallized from the sugar-containing juice as is possible through conventional crystallization. There are, however, methods for recovering additional sucrose from molasses. In one such process, that of M. Saska, C. Pelletan, M. Wu, and X. Lancrenon, "An Audubon Sugar Institute-Applexion Process for Desugarization of Cane Molasses," pp. 281–298, Proc. 52nd Ann. Mtg. Sug. Ind. Tech. (1993), a cation exchange resin in primarily monovalent form is used to separate molasses into three fractions: raffinate, which contains essentially no sugar; extract, which contains primarily sucrose; and invert syrup, which contains primarily monosaccharides. It has now been discovered that the invert product from cane molasses desugarization may be used as a feedstock for industrial inositol separations.

On cation exchange resins, whether in monovalent (e.g., sodium or potassium) or divalent (e.g., calcium) forms, inositol does not separate well from other monosaccharides such as glucose and fructose, and in particular does not separate well from fructose. Following the refining of cane molasses on a cation exchange resin, the inositol is therefore concentrated in the invert fraction. The approximate concentration of inositol in the invert product from sugar cane is 1% to 6%, based on dry weight, depending primarily on the source of the sugar cane.

The invert product from cane molasses is a colored product that is unsuitable for direct consumption. Invert syrup is preferably demineralized (desalted) and decolorized on a series of ion exchange and activated carbon columns through standard procedures. Demineralization and decolorization do not degrade inositol. After these operations, the resulting invert product is a colorless syrup somewhat comparable to high fructose corn syrup, with only traces of salts. The decolored, demineralized invert product typically comprises, on a dry weight basis, about 45% fructose, 40% glucose, 3% sucrose, 3% mannitol, and 1–6% myo-inositol, as well as various minor organic and inorganic components.

A water-based extract of almond hulls is another raw plant extract that is high in inositol, typically containing (on dry solids) about 15% fructose, 20% glucose, 1% sucrose, 5% sorbitol, and 1–5 % myo-inositol.

Soy molasses is a source of myo-inositol, chiro-inositol, and pinitol. Soy molasses is the acid, alcohol, or other extract of de-fatted soy flour or soy flakes. Pinitol is a derivative of chiro-inositol, D-chiro-(+)-O-methyl-inositol. Pinitol may be readily converted into chiro-inositol by, for example, hydrolysis with hydroiodic acid.

Commercially available anion exchange resins are typically sold in chloride form. A chloride-form anion exchange resin does not separate inositol from other sugars and sugar alcohols.

A chloride-form anion exchange resin may readily be converted to a hydroxyl-form resin by passing a hydroxyl-containing solution (typically 1 M NaOH) over the resin. A hydroxyl-form resin will separate inositol from sugars and sugar alcohols, but the sugars bind to the resin too tightly for the process to be commercially useful.

U.S. Pat. No. 5,096,594 discloses a method of purifying cyclitols by applying a plant juice mixture to an ion exchange column and eluting with a dimethyl sulfoxide-water mixture. Specific ion exchange resins mentioned include lead-form and calcium-form cation exchange resins.

U.S. Pat. No. 4,482,761 discloses the use of cation-exchange type X or type Y zeolite molecular sieves in the liquid phase separation of inositol or sorbitol.

U.S. Pat. No. 4,997,489 discloses soaking almond hulls in water to obtain a syrup containing fructose, glucose, inositol, and sorbitol.

U.S. Pat. No. 4,799,965 discloses using a weakly acid cation exchange resin, followed by a weakly basic anion exchange resin, to demineralize beet sugar juice.

U.S. Pat. No. 3,982,956 discloses a method for decolorizing impure sugar solutions by adsorption of the colored impurities onto a weakly basic anion exchange resin.

U.S. Pat. No. 2,929,746 discloses the use of an acid cation exchange resin and a base anion exchange resin to exchange various cations and anions in sugar juice for hydrogen cations and hydroxyl anions. See also U.S. Pat. No. 2,971,868.

U.S. Pat. No. 5,296,364 discloses a microbial method for producing inositol.

U.S. Pat. No. 5,091,596 discloses a method for producing chiro-inositol by hydrolysis of the antibiotic kasugamycin, and describes other potential sources of chiro-inositol.

Another approach (X. Lancrenon, Applexion S. A., private communication, June 1994), first hydrogenates all sugars into sugar alcohols, and then separates inositol from the sugar alcohols on a cation exchange resin.

"Pellicular" HPLC columns (CarboPac™ PA1, Dionex Corporation, Sunnyvale, Calif.) have been used for analytical-scale separations of carbohydrates, including mono- and disaccharides, with a packing of 3–7 micron beads of inert latex, coated with 0.1 micron microparticles of a strong base anion exchanger (a quarternary ammonium anion exchanger). This process uses NaOH as an eluent to separate carbohydrates. An increase in the concentration of hydroxyl ions in the mobile phase is used to accelerate elution from the column. The minute size and high cost of the microbeads preclude the use of this apparatus in industrial-scale separations. See Dionex Corporation, "Installation Instructions and Troubleshooting Guide for the CarboPac™ PA1," document no. 034441, revision 01 (Oct. 1, 1990).

A previously unattained objective in the chromatographic separation of inositol, particularly from plant extracts, is to identify a suitable combination of sorbent and solvent such that the differential affinity of the sorbent for the components to be separated is sufficient to give separation on a system of reasonable size, but also such that the sorbent does not bind any of the components so strongly that frequent periodic regeneration is necessary.

It has been discovered that when a strong base anion exchange resin, such as a chloride-form strong base anion exchange resin, is conditioned with a low concentration of hydroxyl (for example, an NaOH solution with a concentration between 0.1 and 10 mM, preferably between 1 and 10 mM), the conditioned resin separates in, sit, Is from sugars and sugar alcohols, while still allowing ready desorption of the sugars from the resin. The feedstock is first passed over a column containing this conditioned resin, followed by a mobile phase solvent, preferably water. The in, sit, Is have a lower affinity for the treated resin than do the other sugars in the feedstock, and therefore pass through the column more quickly. If desired, continued application of the mobile phase to the column may optionally be used for the selective recovery of other organic materials as well. The novel process may economically be performed on industrial-scale separations, particularly when used in a preferred simulated moving bed chromatographic system. It is believed that this is the first reported instance of any method of obtaining inositol from invert syrup.

Figure 1:
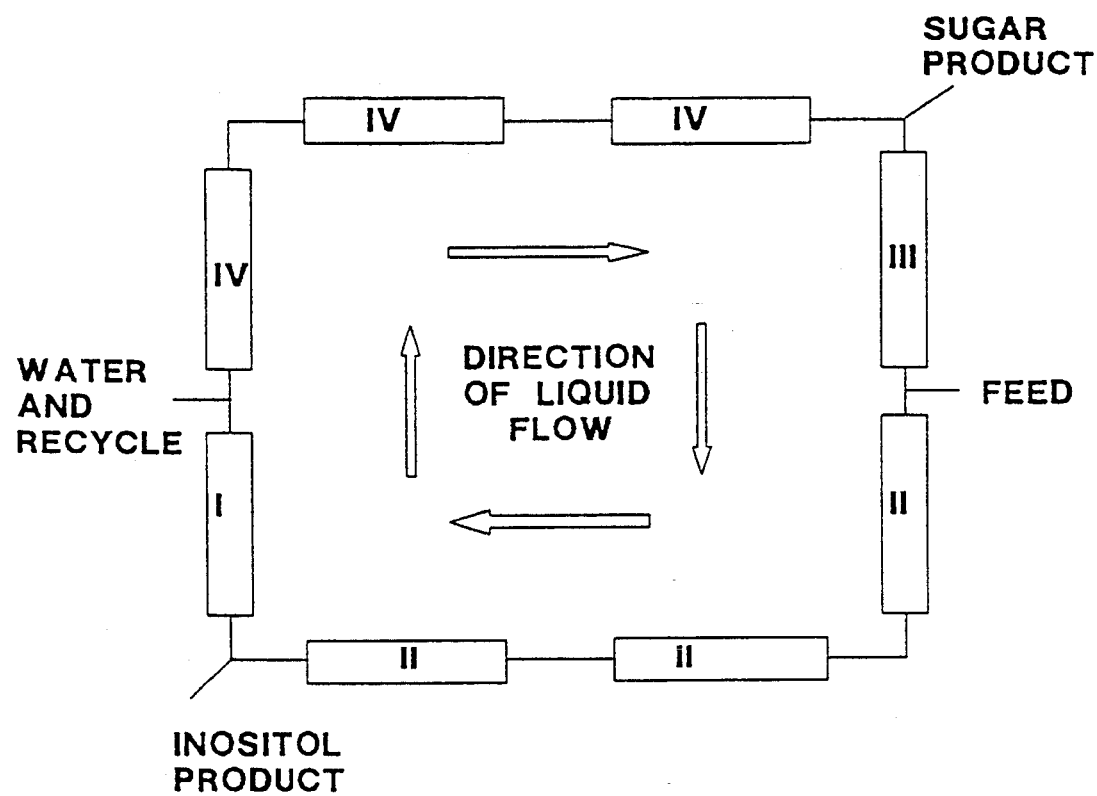
FIG. 1 schematically illustrates a simulated moving bed system suitable for use with the present invention.

Although anion exchange resins are discussed in treating sucrose solutions in some of the prior literature, the resins have previously been used for demineralization of the solutions, i.e., for ion exchange, or for decolorization, i.e., for adsorption. By contrast, in the present invention there is little or no net ion exchange or adsorption between the resin and the solution. Although an anion-type ion exchange resin is used, it is used for its newly-discovered properties as a chromatographic substrate, rather than in a column intended primarily for net exchange of ions.

Chromatographic separation differs from other column-based separations (e.g., ion-exchange or adsorption) in that no major component in the feed mixture is retained by the sorbent so strongly as to require that additional reagents be routinely used between cycles to regenerate the column by removing strongly retained components before the next separation cycle. (Of course, even chromatographic columns require some degree of periodic cleansing or regeneration, but in general a chromatographic column may be re-used for multiple cycles before regeneration.) Put differently, the function of an ion-exchange or adsorption column is to bind components tightly, necessarily requiring frequent regeneration for the resin to be reused. By contrast, the function of a chromatographic column is to provide differential mobility for components moving through the column to effect a separation, but not to bind too tightly to the principal components. Regeneration of a chromatographic column may be needed from time to time due to incidental binding of minor components or impurities to the resin.

The minimal quantity of reagents needed for resin regeneration is a major advantage of chromatographic separations over ion-exchange separations. The operational cost of chromatographic separations is due primarily to the energy needed to evaporate water (or other solvent) from dilute products, and to a lesser extent to the infrequent replacement or regeneration of resin when needed.

A preferred method for large-scale chromatographic separations is the simulated moving bed method ("SMB"). The SMB method reduces consumption of water or other solvent, and hence evaporation costs, as compared with batch methods. The principles of the simulated moving bed method have been generally described, for example, in U.S. Pat. Nos. 5,198,120; 2,985,589; 4,404,037; 4,412,866; and European Patent EP 0 345 511 A2. Briefly, the SMB method uses a number of columns (e.g., 8 to 12 in number) packed with a suitable sorbent and connected in series. There are inlet ports for feed and solvent (which may include recycled solvent), and outlet ports for two or more products (or other separated fractions). The positions of the ports relative to the columns are periodically switched along the direction of the liquid flow, thereby simulating continuous motion of the sorbent relative to the ports and to the liquid. The advantages of the SMB method are those generally associated with counter-current-type operations, namely lower solvent (e.g., water) and sorbent requirements.

FIG. 1 schematically illustrates a simulated moving bed system suitable for use in the present invention. The system comprises eight glass columns (labelled I–IV), each 6 cm ID and 90 cm long. The columns are connected in series as illustrated, such that the bottom of each column is connected to the top of the next column downstream. There are two inlet ports, one for solvent (water) and one for the feed (e.g., decolorized, demineralized invert syrup). The water input to the system preferably comprises a mixture of fresh water and water recycled within the system. There are two outlet ports to withdraw products (or other separated fractions) from the system, e.g. an inositol-enriched product, and a sugar- and sugar alcohol-enriched product. Columns having the same label (e.g., II, IV) have the same liquid velocity, as should be apparent for the exemplary system depicted in FIG. 1. The distribution, number, or size of the columns in the zones could readily be changed, if desired. The particular configuration depicted in FIG. 1 has been found to be suitable for separation of inositol from sugar cane invert syrup.

The SMB process may readily be optimized by adjusting the flow rates (of feed, fresh water, recycled water, and products), and by adjusting the switch time (the time period between moving the ports one column downstream). The net velocities of the components relative to the feed port should be such that inositol moves toward the inositol product outlet, and the sugars and sugar alcohols move toward the sugar product outlet. Furthermore, the velocity in zone IV should be sufficiently high to carry substantially all sugars and sugar alcohols toward the sugar product outlet. Likewise, the velocity in zone I should be low enough to prevent inositol from reaching zone IV, and therefore the sugar product outlet.

The liquid flow rate is lowest in zone I, and highest in zone IV. The flow rates in zones II and III are intermediate, with the rate in zone II being slightly higher because of the feed added at the end of zone III. The resin in zone I may be considered to "clean" the liquid (take everything out), so that it may be recycled to zone IV. In zone IV the liquid flow is relatively fast, so that the components (which should primarily comprise sugars) exit at the sugar product outlet, so the resin is cleaned and can move to zone I. (As the ports switch, the last column in zone IV enters zone I.)

Without wishing to be bound by this theory, it is believed that a likely explanation for the success of the present invention is that at low concentrations (e.g., 1 to 10 mM), NaOH is excluded from the interior of the strong base anion exchange particles by electrostatic repulsion. The hydroxyl ions then affect only the external surface of the resin particles, resulting in a strong base anion exchange resin having a chloride-form (or other anion) core and a hydroxyl-form surface, a resin that has novel separation properties.

The eluant preferably has traces of a base present (e.g., 1 to 10 mM NaOH), such as to just offset the loss of hydroxyl groups on the surface of the resin that will slowly occur as a result of other anions present in the water (e.g., carbonate, bicarbonate, or chloride), or in the feed to be separated (e.g., chloride or sulphate). But the concentration of base should not be high enough to convert the core of the resin to hydroxyl form.

Five strong base styrene-divinylbenzene-based anion exchangers with quaternary ammonium functionality in chloride form, with particle size ranges between 300–650 microns, were tested on a 1 cm ID× 50 cm column. Two of these resins were obtained from Dow Chemical Company (Midland, Mich.): DOWEX Marathon™ A (lot 930930-AN2) and DOWEX 550 A (lot 9301207-AN2). Two resins were obtained from Rohm and Haas Company (Philadelphia, Pa.): IRA-404 (6-2259) and AMBERJET 4200 (7-3050). The fifth resin, a macroporous strong base anion exchanger, Diaion™ SA102M, was obtained from Mitsubishi Kasei Corporation (Tokyo, Japan). The performances of the five resins in the present invention were all comparable.

EXAMPLE 1

Different feedstocks were prepared of deionized water solutions of reagent grade myo-inositol, fructose, glucose, or sucrose (all from Sigma Chemical Co., St. Louis, Mo.). Each feedstock was passed through a column packed with the untreated chloride-form of the resin. In each case, 1 ml of feedstock was fed into a 1 cm ID×50 cm glass column, packed with the resin, and eluted with deionized water at a flow rate of 7 ml/min. Concentrations were measured by continuously monitoring the outlet of the column with a refractive index detector.

Myo-inositol, fructose, glucose, and sucrose each eluted from the column after about 3 minutes. This retention time was what would be expected in the absence of any adsorption, i.e., the void volume of the column (including the dead volume between the injector and the column), divided by the volumetric flow rate.

EXAMPLE 2

The experiment of Example 1 was repeated, except that the resin was converted to carbonate form. The results were essentially similar to those of Example 1.

EXAMPLE 3

The experiment of Example 1 was repeated, except that the resin was converted to hydroxyl form with 1 N NaOH. The sugars apparently adsorbed very strongly to the resin, while myo-inositol eluted as early as it did in Examples 1 and 2. No peaks for the sugars were observed within an hour after injection into the column.

EXAMPLE 4

A 0.2 g/100 ml solution of pure sucrose was passed through the column of Example 3 at a rate of about 7 ml/min, until emergence of sucrose was observed by high performance liquid chromatography ("HPLC") at the column exit, after passage of 26 bed volumes. At that point, the estimated 50 g/liter capacity of the resin to retain sugar had been nearly exhausted. Deionized water was then passed through the column at the same flow rate of 7 ml/min, and the sucrose concentration monitored with HPLC as before. The strong sugar retention on the strong base anion exchange resin was evidenced by the enormous volume of water required to wash the adsorbed sugar off the column, about 45 bed volumes of water to obtain 90% recovery of the sugar.

EXAMPLE 5

The experiment of Example 4 was repeated, except that after the column had been fully loaded with sucrose, the column was given a short wash with deionized water, and then flushed with a 1% NaCl aqueous solution, again at the same flow rate of 7 ml/min. The NaCl converted the resin to chloride form. Full recovery of sucrose was achieved after 7 bed volumes of NaCl solution had passed through the column. The sugar was actually concentrated in the effluent in excess of the feed concentration of 0.2 g/100 ml. The ease of washing off the sugar with NaCl solutions confirmed the negligible adsorption of sugars on chloride-form resins, as also observed in Example 1.

EXAMPLE 6

The experiment of Example 1 was repeated, except that the resins were washed with increasing volumes (2, 4, 6, or 8 bed volumes) of a dilute (4 mM) solution of NaOH. Fructose retention on the column was extended, but fructose still eluted as a distinct peak within reasonable times (at about 4.5, 5, 5.5, and 6 minutes, respectively). By contrast, retention of myo-inositol was not affected, and still left the column at about 3 minutes, as was observed in Example 1. Results for other mono-and di-saccharides that have been tested in comparable experiments (to date, glucose and sucrose) were similar to the results for fructose.

EXAMPLE 7

A single column was used as in Example 6, packed with chloride-form resin and conditioned with 8 bed volumes of 4 mM NaOH. The column was supplied with a feedstock comprising invert syrup obtained following desugarization of Hawaii sugar cane molasses. The invert syrup was substantially decolorized and demineralized using procedures that are standard in sugar cane refining. Briefly, the syrup was passed over a combination of cation and anion exchange resins in hydrogen and hydroxyl forms, respectively, as well as over polystyrene adsorbents. Other conventional processes for decolorization could also be employed, e.g., those based on the use of anion exchange resins in chloride form or carbon-based adsorbents.

The separation yielded a myo-inositol-rich separation product. Initial identification of myo-inositol was based on HPLC analysis, and was confirmed with GC-MS analysis. HPLC analysis gave the results shown in Table I.

TABLE I

| RETENTION TIME (MINUTES) | COMPONENT | % AREA |
| --- | --- | --- |
| 2.17 | MYO-INOSITOL | 26 |
| 2.73 | UNIDENTIFIED | 13 |
| 3.61 | MANNITOL | 29 |
| 13.12 | GLUCOSE | 12 |
| 16.14 | FRUCTOSE | 12 |

Even resins loaded with colorants and totally discolored after extended use have nevertheless retained separation capacity for inositol-sugar alcohol-sugar mixtures over extended periods of time.

EXAMPLE 8

A single column was used as in Example 6, packed with chloride-form resin and conditioned with 8 bed volumes of 4 mM NaOH. The column was supplied with a feedstock comprising soybean molasses, which was produced by acid extraction of de-fatted soybean flour (Central Soya Co., Chemurgy Division, Fort Wayne, Ind.); dilution with deionized water in a 1:2 ratio (by volume, molasses:water); and partial clarification by filtration with a standard laboratory filter press. The partially clarified molasses contained 1.2% inositols (on dry solids) (shown by GC-MS to be primarily myo-inositol, chiro-inositol, and pinitol), 5% sugar alcohols, 18% sucrose, 17% stachyose, and smaller amounts of other sugars (including raffinose, maltose, glucose, and fructose). The partially clarified molasses was demineralized by ion exchange, passing first through a strong cation exchanger in hydrogen form (Purolite™ C155S, Purolite Co., Cynwyd, Pa.), and then through a weak acid anion exchanger in hydroxyl form (A-385, Sybron Chemicals, Birmingham, N.J.). The demineralization did not appreciably alter the relative percentages of inositols, sugar alcohols, or sugars.

This partially-clarified, demineralized soy molasses was separated on a single column as described in Example 6. Two fractions were collected at the outlet of the column, which was continuously monitored with a refractive index detector. A good measure of the degree of separation achieved was the ratio of inositol concentration to sucrose concentration. In the first, "fast fraction," which eluted between about 1.4 and about 2.2 minutes, this ratio was found to be about 0.7 (measured via HPLC). In the second, "slow fraction," which eluted between about 2.2 and about 8.8 minutes, this ratio was found to be about 0.07. Thus inositols from soy molasses were successfully separated with the techniques of the present invention.

EXAMPLE 9

Inositol separation from monosaccharides (e.g., glucose, fructose, galactose) is more efficient than is inositol separation from oligosaccharides (e.g. , sucrose, raffinose, stachyose). It can therefore be advantageous first to hydrolyze oligosaccharides to monosaccharides, prior to performing the separation. Standard hydrolysis procedures such as acid or enzymatic hydrolysis may be used. For example, because myo-inositol and chiro-inositol are stable under acidic conditions, hydrolysis with a mineral acid such as hydrochloric acid may be employed.

Soy molasses, clarified and demineralized as described in Example 8, was hydrolyzed with HCl at about 95° C.; was then filtered and neutralized with NaOH; and was separated on a column with the procedures as otherwise described in Example 8. The residual sucrose concentration after hydrolysis was small, so a useful measure of the separation capability of the system was found to be the ratio of inositol to galactose. This ratio was found to be 0.9 in the first, "fast fraction," which eluted between about 1.6 and about 3.6 minutes. In the second, "slow fraction," which eluted between about 3.6 minutes and about 12.4 minutes, this ratio was found to be about 0.06, demonstrating the capability of this system to separate inositol from sugars.

EXAMPLE 10

Dry almond hulls (obtained from Cerechem Corp., Carpinteria, Calif.) were extracted with water at about 60° C. to obtain an extract having approximately 2.8% dry solids by weight. The extract (on dry solids) comprised about 2.0% inositol, 6 % sorbitol, 17 % glucose, 20 % fructose, and smaller amounts of other sugars. This extract was filtered, and then concentrated under vacuum to 6.7% dry solids by weight. The extract was then demineralized by passage first through a column packed with a strong acid cation exchanger in hydrogen form (IR200™, Rohm and Haas, Philadelphia, Pa.), and then through a column packed with a strong base anion exchanger in hydroxyl form (Marathon™ A, Dow Chemical Co., Midland, Mich.). The demineralized extract was then concentrated to 20% dry solids (by weight) under vacuum, with an inositol content of 4.6% (on dry solids).

A portion of this pretreated extract was then diluted with deionized water in a 1:7 ratio (extract:water), and separated on a column as otherwise described in Example 6. In this case, it was found useful to express the separation capacity of the system as the ratio of inositol to glucose. This ratio was found to be 214 in the first, "fast fraction," which eluted between about 2.2 and about 2.8 minutes. In the second, "slow fraction," which eluted between about 2.8 and about 8.2 minutes, this ratio was found to be about 0.7, demonstrating the capability of this system to separate inositol from sugars.

EXAMPLE 11

An eight-column simulated moving bed separator was prepared as previously described, and as illustrated schematically in FIG. 1. The separator had glass columns 6 cm ID× 90 cm long, each packed with Marathon™ A strong base anion exchange resin (Dow Chemical Company) in chloride form, and conditioned with 5 mM NaOH. The separator was operated at the parameters listed in Table II. The feed was a synthetic mixture of myo-inositol (5 g/l), fructose (25 g/l) and glucose (100 g/l). The mobile phase was chosen as 5 mM NaOH. Excellent separation of inositol from the sugars was achieved. The purity of the myo-inositol-rich product was in excess of 90% (versus a feed purity of 4%), and more than 95% of the myo-inositol was recovered in this product. No drift in the performance characteristics was observed over a period of one week of repeated operation.

TABLE II

| | |
|---|---|
| FEED RATE, G/MIN | 32 |
| MOBILE PHASE FLOW RATE, ML/MIN | 325 |
| SUGAR PRODUCT, ML/MIN | 275 |
| MYO-INOSITOL PRODUCT, ML/MIN | 75 |
| RECYCLE FLOW RATE, ML/MIN | 55 |
| SWITCH TIME, MIN | 15.0 |
| MOBILE PHASE | 5 mM NaOH |
| TEMPERATURE | 50° C. |

EXAMPLE 12

The experiment of Example 11 was repeated, except as otherwise stated below. The feed was a synthetic mixture of myo-inositol (5 g/l), mannitol (5 g/l), glucose (108 g/l), and fructose (27 g/l). Operating parameters were as listed in Table III. Excellent separation was achieved of the myo-inositol from both the sugar alcohol (mannitol) and from the sugars. The purity of the myo-inositol product was 93 % (versus a feed purity of 4%), with close to 100% of the myo-inositol recovered in the inositol product.

TABLE III

| | |
|---|---|
| FEED RATE, G/MIN | 27 |
| MOBILE PHASE FLOW RATE, ML/MIN | 325 |
| SUGAR PRODUCT, ML/MIN | 275 |
| MYO-INOSITOL PRODUCT, ML/MIN | 77 |
| RECYCLE FLOW RATE, ML/MIN | 60 |
| SWITCH TIME, MIN | 15.0 |
| MOBILE PHASE | 5 mM NaOH |
| TEMPERATURE | 50° C. |

Most sugar alcohols (e.g., mannitol, sorbitol, arabitol, etc.) have an affinity for sorbents in accordance with the present invention that is intermediate between the affinities of the inositols (myo-inositol, chiro-inositol, pinitol, etc.) and the sugars (glucose, fructose, etc.). A small change in the operating parameters (such as the mobile phase flow rate or the switch time) can be made, if desired, to reverse the partition of the sugar alcohol between the inositol product and the sugar products. In general, the inositols are higher-valued products than are the sugars and sugar alcohols, and it will generally be desirable to isolate the inositols in a fraction that is substantially free of sugars and sugar alcohols. Therefore, it will usually be preferred to choose separation conditions such that the sugar alcohols will be concentrated in the sugar products. Nevertheless, it may sometimes be desirable to select separation conditions so that the sugar alcohol partitions in the inositol product; or, in the absence of inositols, to choose the conditions to separate the sugar alcohol from the sugars.

With less pure feeds, such as natural extracts containing other anions (e.g., chloride or sulphate), the strength of the base in the mobile phase may have to be adjusted. Natural extracts (e.g., invert sugar, or water extracts of almond hulls) preferably are first demineralized in a conventional manner, e.g., by passing through a column packed with a strong acid cation exchange resin followed by a column packed with a strong base anion exchange resin, or a single column with a mixed bed of cation and anion exchange resins. As in other forms of chromatographic separations, to protect the chromatography column resin from premature fouling, it is preferred to use feeds that are optically clear, with a concentration of suspended solids less than about 100 mg/l. Standard processes for clarification may be used, including centrifugation, filtration, settling, flocculation, or a combination of these techniques. The clarification is preferably performed prior to the demineralization, to protect the demineralization resins from fouling as well.

Although chloride-form resins are preferred, anion exchange resins other than in chloride form before conditioning with base) will also work in practicing the present invention. The anion should not be strongly basic, or as is the case when a hydroxide-form resin is used, sugars will bind the resin too tightly. Additionally, the physical size of the anion should not be so large (e.g., some polymeric anions) as to block access to the resin. Otherwise, most common anions will work in the present invention. Illustrative of anions that may be substituted for chloride in practicing the present invention are fluoride, bromide, iodide, nitrite, nitrate, sulphate, bisulphate, monobasic or dibasic phosphate, chlorate, citrate, chlorate, cyanide, sulphite, bisulphite, bromate, carbonate, bicarbonate, iodate, formate, propionate, and acetate.

Although the conditioning of the bed is preferably performed with one to ten bed volumes of hydroxyl ion at a concentration between 1 and 10 mM, it will also be possible to practice the present invention by conditioning the bed with at least one-tenth bed volume of hydroxyl ion in a concentration between 0.1 mM and 100 mM.

The entire disclosures of all references cited in this specification are hereby incorporated by reference in their entirety. In the event of an otherwise irresolvable conflict, the present specification shall control over a document incorporated by reference.

We claim:

1. A method for separating an inositol from an aqueous phase comprising the inositol and at least one other component selected from the group consisting of a sugar and a sugar alcohol, the method comprising the steps of passing the aqueous phase over a resin, and collecting that portion of the aqueous phase exiting the resin that contains the inositol; wherein the resin comprises a strong base anion exchange resin in chloride form that has been conditioned with a sufficient concentration of hydroxyl ion that hydroxyl ion resides on the surface of the resin, but such that the hydroxyl ion does not penetrate the interior of the resin.

2. A method for separating an inositol from an aqueous phase comprising the inositol and at least one other component selected from the group consisting of a sugar and a sugar alcohol, the method comprising the steps of passing the aqueous phase over a resin, and collecting that portion of the aqueous phase exiting the resin that contains the inositol; wherein the resin comprises a strong base anion exchange resin in chloride form that has been conditioned with at least one-tenth bed volume of an aqueous solution of hydroxyl ion in a concentration between 0.1 millimolar and 100.0 millimolar.

3. A method as recited in claim 2, wherein the inositol comprises myo-inositol.

4. A method as recited in claim 2, wherein the inositol comprises chiro-inositol.

5. A method as recited in claim 2, wherein the inositol comprises pinitol.

6. A method as recited in claim 2, wherein the aqueous phase comprises invert syrup from sugar cane molasses.

7. A method as recited in claim 2, wherein the aqueous phase comprises sugar cane molasses or sugar beet molasses.

8. A method as recited in claim 2, wherein the aqueous phase comprises an aqueous extract of almond hulls.

9. A method as recited in claim 2, wherein the aqueous phase comprises soy molasses.

10. A method as recited in claim 2, additionally comprising the step of demineralizing the aqueous phase, before conducting said step of passing the aqueous phase over the resin.

11. A method as recited in claim 2, additionally comprising the step of clarifying the aqueous phase to have a suspended solids concentration less than about 100 mg per liter, before conducting said step of passing the aqueous phase over the resin.

12. A method as recited in claim 2, additionally comprising the steps of demineralizing the aqueous phase, and clarifying the aqueous phase to have a suspended solids concentration less than about 100 mg per liter, both said demineralizing step and said clarifying step being conducted before conducting said step of passing the aqueous phase over the resin.

13. A method as recited in claim 2, wherein said method is performed in a simulated moving bed chromatographic system.

14. A method as recited in claim 2, wherein the aqueous phase comprises at least one oligosaccharide sugar, and wherein said method additionally comprises the step of hydrolyzing the oligosaccharide prior to said step of passing the aqueous phase over a resin.

15. A method as recited in claim 2, wherein the resin comprises a strong base anion exchange resin in chloride form that has been conditioned with between one and ten bed volumes of an aqueous solution of hydroxyl ion in a concentration between 1.0 millimolar and 10.0 millimolar.

16. A method for separating an inositol from an aqueous phase comprising the inositol and at least one other component selected from the group consisting of a sugar and a sugar alcohol, the method comprising the steps of passing the aqueous phase over a resin, and collecting that portion of the aqueous phase exiting the resin that contains the inositol; wherein the resin comprises a strong base anion exchange resin in an anion form, other than hydroxyl form, that has been conditioned with a sufficient concentration of hydroxyl ion that hydroxyl ion resides on the surface of the resin, but such that the hydroxyl ion does not penetrate the interior of the resin.

17. A method as recited in claim 16, wherein said method is performed in a simulated moving bed chromatographic system.

18. A method for separating an inositol from an aqueous phase comprising the inositol and at least one other component selected from the group consisting of a sugar and a sugar alcohol, the method comprising the steps of passing the aqueous phase over a resin, and collecting that portion of the aqueous phase exiting the resin that contains the inositol; wherein the resin comprises a strong base anion exchange resin in an anion form, other than hydroxyl form, that has been conditioned with at least one-tenth bed volume of an aqueous solution of hydroxyl ion in a concentration between 0.1 millimolar and 100.0 millimolar.

19. A method as recited in claim 18, wherein the resin comprises a strong base anion exchange resin in chloride form that has been conditioned with between one and ten bed volumes of an aqueous solution of hydroxyl ion in a concentration between 1.0 millimolar and 10.0 millimolar..

* * * * *